United States Patent
Ju et al.

(10) Patent No.: US 10,826,121 B2
(45) Date of Patent: Nov. 3, 2020

(54) ELECTROLYTE AND SECONDARY BATTERY

(71) Applicant: CONTEMPORARY AMPEREX TECHNOLOGY CO., LIMITED, Ningde (CN)

(72) Inventors: Feng Ju, Ningde (CN); Shaowei Feng, Ningde (CN); Changlong Han, Ningde (CN); Xiaochong Zhou, Ningde (CN); Ming Zhang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 284 days.

(21) Appl. No.: 15/891,197

(22) Filed: Feb. 7, 2018

(65) Prior Publication Data

US 2018/0226685 A1      Aug. 9, 2018

(30) Foreign Application Priority Data

Feb. 7, 2017 (CN) .......................... 2017 1 0067853

(51) Int. Cl.
*H01M 10/0567* (2010.01)
*H01M 10/0569* (2010.01)
*H01M 10/0525* (2010.01)

(52) U.S. Cl.
CPC ... *H01M 10/0567* (2013.01); *H01M 10/0525* (2013.01); *H01M 10/0569* (2013.01); *H01M 2300/004* (2013.01); *H01M 2300/0025* (2013.01)

(58) Field of Classification Search
CPC ......... H01M 10/0567; H01M 10/0525; H01M 10/0569
See application file for complete search history.

(56) References Cited

U.S. PATENT DOCUMENTS

2012/0315551 A1* 12/2012 Bhat .................. H01M 10/052
429/339

FOREIGN PATENT DOCUMENTS

| CN | 1572034 A | 1/2005 |
|---|---|---|
| CN | 102881869 A | 1/2013 |
| CN | 104201388 B | 6/2016 |

OTHER PUBLICATIONS

Shkrob et al., Reduction of Carbonate Electrolytes and the Formation of Solid-Electrolyte Interface (SEI) in Lithium-Ion Batteries. 1. Spectroscopic Observations of Radical Intermediates Generated in One-Electron Reduction of Carbonates, J Phys. Chem., ACS, vol./Issue 117, 38, pp. 19255-19269 (Year: 2013).*
Schmidt et al., Growth and Characterization of BPO4 Single Crystals, Z. Anorg. Allg. Chem., pp. 655-662 (Year: 2004).*

* cited by examiner

*Primary Examiner* — Jayne L Mershon
(74) *Attorney, Agent, or Firm* — Morgan, Lewis & Bockius LLP

(57) ABSTRACT

The present disclosure provides an electrolyte and a secondary battery. The electrolyte comprises: a non-aqueous organic solvent; an electrolyte salt dissolved in the non-aqueous organic solvent; and an additive dissolved in the non-aqueous organic solvent. The additive comprises a first additive, the first additive is selected from boron phosphate represented by formula 1. When the electrolyte of the present disclosure is applied in the secondary battery, the performances of the secondary battery under high temperature environment can be effectively improved.

Formula 1

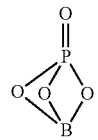

10 Claims, No Drawings

ELECTROLYTE AND SECONDARY BATTERY

CROSS-REFERENCE TO RELATED APPLICATIONS

The present application claims priority to Chinese patent application No. CN201710067853.0, filed on Feb. 7, 2017, which is incorporated herein by reference in its entirety.

FIELD OF THE PRESENT DISCLOSURE

The present disclosure relates to the field of battery, and particularly relates to an electrolyte and a secondary battery.

BACKGROUND OF THE PRESENT DISCLOSURE

A lithium-ion secondary battery is a green, high-capacity and environment-friendly battery appeared in the 1990s. Due to advantages, such as high voltage, small volume, light mass, high specific capacity, non-memory effect, non-pollution, small self-discharge and long cycle life, the lithium-ion secondary battery has been widely applied in light, thin, small and multi-functional portable electronic products, such as mobile phones, laptops, video cameras, digital cameras and tablet personal computers.

Recently, with depletion of global petroleum resources and development of new energy technologies, the lithium ion secondary battery used as a power supply of an electric vehicle has been rapidly developed. However, people present higher requirements on performances of the lithium-ion secondary battery. In order to meet the requirements of the electric vehicle for long operation time, long endurance mileage, long cycle life, operating properly under both high temperature environment and low temperature environment and enabling fast charging, the lithium-ion secondary battery needs to have higher discharge capacity, higher energy density, more excellent high temperature cycle performance, more excellent high temperature storage performance and more excellent low temperature rate performance. In particular, when the conventional electrolyte is used under high temperature environment, the performances of the lithium-ion secondary battery are serious deteriorated.

SUMMARY OF THE PRESENT DISCLOSURE

In view of the problems existing in the background, an object of the present disclosure is to provide an electrolyte and a secondary battery, when the electrolyte is applied in the secondary battery, performances of the secondary battery under high temperature environment can be effectively improved.

In order to achieve the above objects, in a first aspect of the present disclosure, the present disclosure provides an electrolyte, which comprises: a non-aqueous organic solvent; an electrolyte salt dissolved in the non-aqueous organic solvent; and an additive dissolved in the non-aqueous organic solvent. The additive comprises a first additive, the first additive is selected from boron phosphate represented by formula 1.

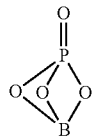

Formula 1

In a second aspect of the present disclosure, the present disclosure provides a secondary battery, which comprises the electrolyte according to the first aspect of the present disclosure.

The present disclosure has following beneficial effects: in the electrolyte of the present disclosure, oxidation products of the boron phosphate during charging process can form a stable protective membrane on the surface of the active material, therefore side reactions between the electrolyte and the surface of the active material are effectively decreased, the amount of transition metal dissolution of the positive active material is decreased, and high temperature cycle performance and high temperature storage performance of the secondary battery are improved. Moreover, there is a complexation reaction between B atom in the boron phosphate and hydrofluoric acid in the electrolyte, therefore the gas generation amount of the secondary battery after stored under high temperature environment is decreased.

DETAILED DESCRIPTION

Hereinafter an electrolyte and a secondary battery according to the present disclosure are described in detail.

Firstly, an electrolyte according to a first aspect of the present disclosure is described.

The electrolyte according to the first aspect of the present disclosure comprises: a non-aqueous organic solvent; an electrolyte salt dissolved in the non-aqueous organic solvent; and an additive dissolved in the non-aqueous organic solvent. The additive comprises a first additive, the first additive is selected from boron phosphate represented by formula 1.

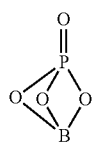

Formula 1

In the electrolyte according to the first aspect of the present disclosure, oxidation products of the boron phosphate during charging process can form a stable protective membrane on the surface of the active material, therefore side reactions between the electrolyte and the surface of the active material are effectively decreased, the amount of transition metal dissolution of the positive active material is also decreased, and high temperature cycle performance and high temperature storage performance of the secondary battery are improved. The boron phosphate belongs to Lewis base and P=O in the boron phosphate has lone pair electrons, there is a complexation reaction between the boron phosphate and $PF_5$ in the electrolyte, therefore reactivity of $PF_5$ is decreased, probability of occurrence of the side reactions is also decreased, and high temperature cycle performance of the secondary battery is improved. Moreover, there is also a complexation reaction between B atom in the boron phosphate and hydrofluoric acid in the electrolyte, therefore the gas generation amount of the secondary battery after stored under high temperature is decreased.

In the electrolyte according to the first aspect of the present disclosure, the additive may further comprise a second additive, the second additive may be one or more selected from a group consisting of sulfur-containing cyclic lactone, C—C double bond-containing cyclic carbonate ester, and cyclic carboxylic anhydride.

In the electrolyte according to the first aspect of the present disclosure, the sulfur-containing cyclic lactone may comprise cyclic sulfate and cyclic sulfonate.

In the electrolyte according to the first aspect of the present disclosure, the cyclic sulfate may be one or more selected from a group consisting of compounds represented by formula 2 to formula 5. In formula 2 to formula 5, $R_1 \sim R_{14}$ are independently selected from a group consisting of H, substituted or unsubstituted C1~C10 alkyl, substituted or unsubstituted C2~C10 alkenyl, substituted or unsubstituted C2~C10 alkynyl and substituted or unsubstituted C6~C10 aryl.

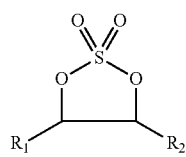

Formula 2

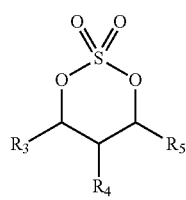

Formula 3

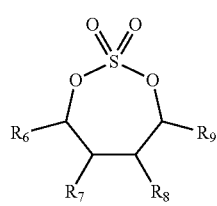

Formula 4

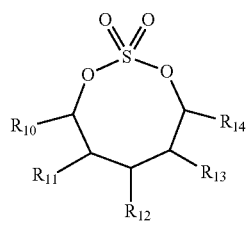

Formula 5

In the electrolyte according to the first aspect of the present disclosure, the cyclic sulfonate may be one or more selected from a group consisting of compounds represented by formula 6 to formula 9. In formula 6 to formula 9, $R_{15} \sim R_{32}$ are independently selected from a group consisting of H, halogen atom, substituted or unsubstituted C1~C10 alkyl, substituted or unsubstituted C2~C10 alkenyl, substituted or unsubstituted C2~C10 alkynyl and substituted or unsubstituted C6~C10 aryl.

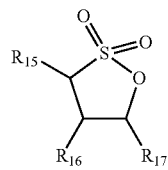

Formula 6

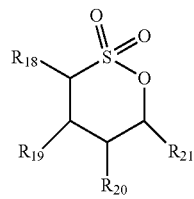

Formula 7

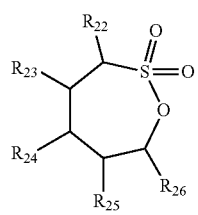

Formula 8

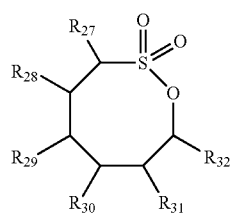

Formula 9

In the electrolyte according to the first aspect of the present disclosure, the C—C double bond-containing cyclic carbonate ester may be one or more selected from a group consisting of compounds represented by formula 10 to formula 19. In formula 10 to formula 19, $R_{33} \sim R_{57}$ are independently selected from a group consisting of H, halogen atom, substituted or unsubstituted C1~C10 alkyl, substituted or unsubstituted C2~C10 alkenyl, substituted or unsubstituted C2~C10 alkynyl and substituted or unsubstituted C6~C10 aryl.

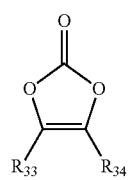

Formula 10

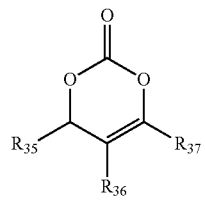

Formula 11

-continued

Formula 12
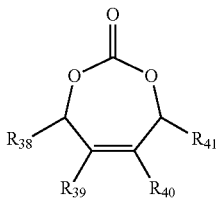

Formula 13
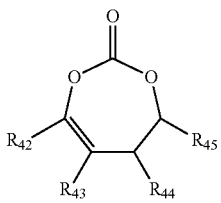

Formula 14
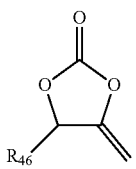

Formula 15
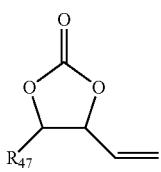

Formula 16
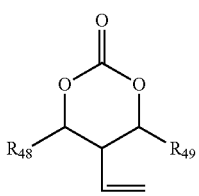

Formula 17
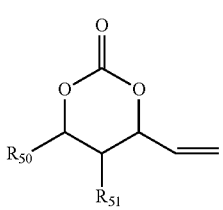

Formula 18
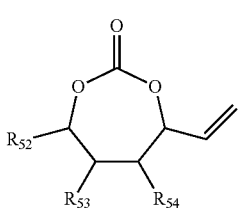

Formula 19
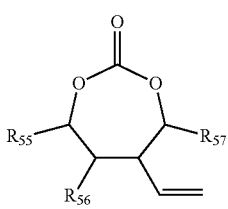

In the electrolyte according to the first aspect of the present disclosure, the cyclic carboxylic anhydride may be one or more selected from a group consisting of compounds represented by formula 20 and formula 21. In formula 20 and formula 21, $R_{58}$~$R_{61}$ each are independently one selected from a group consisting of H, halogen atom, substituted or unsubstituted C1~C10 alkyl, substituted or unsubstituted C2~C10 alkenyl, substituted or unsubstituted C2~C10 alkynyl and substituted or unsubstituted C6~C10 aryl.

Formula 20
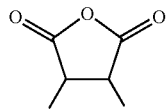

Formula 21
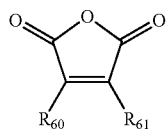

In the electrolyte according to the first aspect of the present disclosure, specifically, the second additive may be one or more selected from a group consisting of the following compounds:

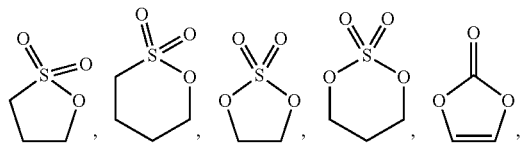

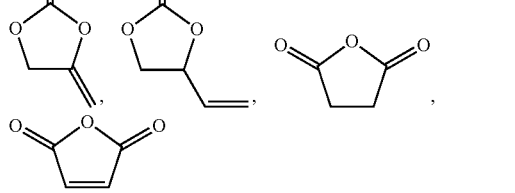

In the electrolyte according to the first aspect of the present disclosure, a mass of the first additive may be 0.01%~5% of a total mass of the electrolyte.

In the electrolyte according to the first aspect of the present disclosure, a mass of the second additive may be 0.01%~5% of the total mass of the electrolyte.

In the electrolyte according to the first aspect of the present disclosure, a specific type of the non-aqueous organic solvent is not specifically limited and may be selected based on actual demands. The non-aqueous organic solvent may comprise conventional carbonate ester and conventional carboxylic acid ester. The carbonate ester may comprise cyclic carboxylic acid ester and/or chain carboxylic acid ester. Preferably, the non-aqueous organic solvent comprises: cyclic carbonate ester; and chain carbonate ester and/or a carboxylic acid ester.

In the electrolyte according to the first aspect of the present disclosure, specifically, the cyclic carbonate ester may be one or more selected from a group consisting of ethylene carbonate, propylene carbonate, 2,3-butylene carbonate and γ-butyrolactone.

In the electrolyte according to the first aspect of the present disclosure, specifically, the chain carbonate ester may be one or more selected from a group consisting of dimethyl carbonate, diethyl carbonate, dipropyl carbonate, ethyl methyl carbonate, methyl propyl carbonate and ethyl propyl carbonate.

In the electrolyte according to the first aspect of the present disclosure, specifically, the carboxylic acid ester may be one or more selected from a group consisting of methyl formate, ethyl formate, propyl formate, methyl acetate, ethyl acetate, propyl acetate, methyl propionate, ethyl propionate and propyl propionate.

In the electrolyte according to the first aspect of the present disclosure, the non-aqueous organic solvent may further comprise halogenated carbonate ester. Specifically, the non-aqueous organic solvent may further comprise fluoroethylene carbonate.

In the electrolyte according to the first aspect of the present disclosure, the electrolyte salt may be a lithium salt, a sodium salt or a zinc salt, and the specific type of the electrolyte salt may be changed according to the specific type of the secondary battery.

In the electrolyte according to the first aspect of the present disclosure, a molar concentration of the electrolyte salt in the electrolyte may be 0.01 mol/L~3 mol/L.

Next a secondary battery according to a second aspect of the present disclosure is described.

The secondary battery according to the second aspect of the present disclosure comprises the electrolyte according to the first aspect of the present disclosure.

In the secondary battery according to the second aspect of the present disclosure, the secondary battery may be a lithium secondary battery, a sodium secondary battery or a zinc secondary battery. The lithium secondary battery may be a lithium-ion secondary battery or a metal lithium secondary battery.

In the secondary battery according to the second aspect of the present disclosure, the secondary battery further comprises a positive electrode plate, a negative electrode plate, a separator and a package shell. The positive electrode plate comprises a positive current collector and a positive film, the positive film is positioned on the positive current collector, and the positive film comprises a positive active material. The negative electrode plate comprises a negative current collector and a negative film, the negative film is positioned on the negative current collector, and the negative film comprises a negative active material. The separator is interposed between the positive electrode plate and the negative electrode plate.

When the secondary battery is a lithium-ion secondary battery, the positive active material may be one or more selected from a group consisting of lithium cobaltate (LiCoO$_2$), lithium manganese dioxide (LiMnO$_2$), lithium nickel cobalt manganese oxide (NCM), lithium nickel cobalt aluminum oxide (NCA), lithium iron phosphate (LiFePO$_4$) and lithium iron manganese phosphate (LiMn$_x$Fe$_{1-x}$PO$_4$). The negative active material may be one or more selected from a group consisting of natural graphite, artificial graphite, soft carbon, hard carbon, lithium titanium oxide, silicon, and silicon-carbon composite. The electrolyte salt (that is the lithium salt) may be one or more selected from a group consisting of Li(FSO$_2$)$_2$N, LiPF$_6$, LiBF$_4$, LiBOB, LiDFOB, LiAsF$_6$, Li(CF$_3$SO$_2$)$_2$N, LiCF$_3$SO$_3$ and LiClO$_4$.

Hereafter the present disclosure will be described in detail in combination with examples. It should be noted that, the examples described in the present disclosure are only used for explaining the present disclosure, and are not intended to limit the present disclosure. In the example, the illustrated secondary battery is a lithium-ion secondary battery, but the present disclosure is not limited.

Example 1

(1) Preparation of a positive electrode plate: LiNi$_{1/3}$Co$_{1/3}$Mn$_{1/3}$O$_2$ (positive active material), Super-P (conductive agent), PVDF (binder) according to a mass ratio of 96:2:2 were uniformly mixed with N-methyl-2-pyrrolidone (solvent) to form a positive electrode slurry, then the positive electrode slurry was uniformly coated on an aluminum foil (positive current collector) with a coating weight of 0.018 g/cm$^2$, baking was then performed at 85° C., which was followed by cold pressing, then after edge-trimming, plate cutting, slitting, baking at 85° C. for 4 h under vacuum and welding a tab, the required positive electrode plate was obtained.

(2) Preparation of a negative electrode plate: artificial graphite (negative active material), Super-P (conductive agent), CMC (thickening agent), SBR (binder) according to a mass ratio of 96.5:1.0:1.0:1.5 were uniformly mixed with deionized water (solvent) to form a negative electrode slurry, then the negative electrode slurry was uniformly coated on a copper foil (negative current collector) with a coating weight of 0.0089 g/cm$^2$, baking was then performed at 85° C., which was followed by cold pressing, then after edge-trimming, plate cutting, slitting, baking at 110° C. for 4 h under vacuum and welding a tab, the required negative electrode plate was obtained.

(3) Preparation of an electrolyte: the electrolyte used LiPF$_6$ with a molar concentration of 1 mol/L as a lithium salt, and used a mixture of ethylene carbonate (EC), ethyl methyl carbonate (EMC) and diethyl carbonate (DEC) as a non-aqueous organic solvent, a mass ratio of EC, EMC and DEC was 30:50:20. Moreover, the electrolyte further contained an additive, the additive was boron phosphate, and a mass of the boron phosphate was 1% of a total mass of the electrolyte.

(4) Preparation of a lithium-ion secondary battery: the prepared positive electrode plate, the prepared negative electrode plate and a separator (PE membrane) were wound to form a cell having a thickness of 8 mm, a width of 60 mm and a length of 130 mm, then baking was performed at 75° C. for 10 h under vacuum, then the prepared electrolyte was injected and standby for 24 h, which was followed by charging to 4.2 V at a constant current of 0.1 C (160 mA), then charging to 0.05 C (80 mA) at a constant voltage of 4.2 V, then discharging to 3.0 V at a constant current of 0.1 C (160 mA), the above charging and discharging process were repeated twice, which was followed by charging to 3.8 V at a constant current of 0.1 C (160 mA), and finally the preparation of the lithium-ion secondary battery was completed.

Example 2

The lithium-ion secondary battery was prepared according to example 1, except that in the preparation of the electrolyte (step (3)), the additive was boron phosphate, the mass of the boron phosphate was 0.5% of the total mass of the electrolyte.

Example 3

The lithium-ion secondary battery was prepared according to example 1, except that in the preparation of the electrolyte (step (3)), the additive was boron phosphate, the mass of the boron phosphate was 3% of the total mass of the electrolyte.

Example 4

The lithium-ion secondary battery was prepared according to example 1, except that in the preparation of the electrolyte (step (3)), the additive was boron phosphate, the mass of the boron phosphate was 5% of the total mass of the electrolyte.

Example 5

The lithium-ion secondary battery was prepared according to example 1, except that in the preparation of the electrolyte (step (3)), the additive was boron phosphate and ethylene sulfate, the mass of the boron phosphate was 1% of the total mass of the electrolyte, the mass of the ethylene sulfate was 1% of the total mass of the electrolyte.

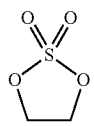

Example 6

The lithium-ion secondary battery was prepared according to example 1, except that in the preparation of the electrolyte (step (3)), the additive was boron phosphate and 1,3-propanesultone, the mass of the boron phosphate was 1% of the total mass of the electrolyte, the mass of the 1,3-propanesultone was 1% of the total mass of the electrolyte.

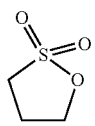

Example 7

The lithium-ion secondary battery was prepared according to example 1, except that in the preparation of the electrolyte (step (3)), the additive was boron phosphate and vinylene carbonate, the mass of the boron phosphate was 1% of the total mass of the electrolyte, the mass of the vinylene carbonate was 1% of the total mass of the electrolyte.

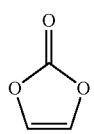

Example 8

The lithium-ion secondary battery was prepared according to example 1, except that in the preparation of the electrolyte (step (3)), the additive was boron phosphate and vinyl ethylene carbonate, the mass of the boron phosphate was 1% of the total mass of the electrolyte, the mass of the vinyl ethylene carbonate was 1% of the total mass of the electrolyte.

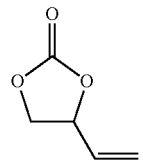

Example 9

The lithium-ion secondary battery was prepared according to example 1, except that in the preparation of the electrolyte (step (3)), the additive was boron phosphate and maleic anhydride, the mass of the boron phosphate was 1% of the total mass of the electrolyte, the mass of the maleic anhydride was 1% of the total mass of the electrolyte.

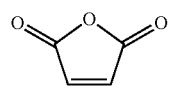

Comparative Example 1

The lithium-ion secondary battery was prepared according to example 1, except that in the preparation of the electrolyte (step (3)), there was no additive in the electrolyte.

Comparative Example 2

The lithium-ion secondary battery was prepared according to example 1, except that in the preparation of the electrolyte (step (3)), the additive was boron phosphate, the mass of the boron phosphate was 0.001% of the total mass of the electrolyte.

Comparative Example 3

The lithium-ion secondary battery was prepared according to example 1, except that in the preparation of the electrolyte (step (3)), the additive was boron phosphate, the mass of the boron phosphate was 8% of the total mass of the electrolyte.

Comparative Example 4

The lithium-ion secondary battery was prepared according to example 1, except that in the preparation of the electrolyte (step (3)), the additive was ethylene sulfate, the mass of the ethylene sulfate was 1% of the total mass of the electrolyte.

Comparative Example 5

The lithium-ion secondary battery was prepared according to example 1, except that in the preparation of the electrolyte (step (3)), the additive was 1,3-propanesultone, the mass of the 1,3-propanesultone was 1% of the total mass of the electrolyte.

Comparative Example 6

The lithium-ion secondary battery was prepared according to example 1, except that in the preparation of the electrolyte (step (3)), the additive was vinylene carbonate, the mass of the vinylene carbonate was 1% of the total mass of the electrolyte.

Comparative Example 7

The lithium-ion secondary battery was prepared according to example 1, except that in the preparation of the electrolyte (step (3)), the additive was vinyl ethylene carbonate, the mass of the vinyl ethylene carbonate was 1% of the total mass of the electrolyte.

Comparative Example 8

The lithium-ion secondary battery was prepared according to example 1, except that in the preparation of the electrolyte (step (3)), the additive was maleic anhydride, the mass of the maleic anhydride was 1% of the total mass of the electrolyte.

Finally, test processes and test results of the lithium-ion secondary batteries were described.

(1) Testing of high temperature cycle performance of the lithium-ion secondary battery At 60° C., the lithium-ion secondary battery was charged to 4.2 V at a constant current of 1 C, then the lithium-ion secondary battery was charged to 0.05 C at a constant voltage of 4.2 V, then the lithium-ion secondary battery was discharged to 2.8 V at a constant current of 1 C, this process was the first cycle process, the obtained discharge capacity was the discharge capacity of the first cycle. Then the cycle process was repeated, the discharge capacity of 500$^{th}$ cycle of the lithium-ion secondary battery was marked.

Capacity retention rate after 500 cycles under 60° C. of the lithium-ion secondary battery (%)=(discharge capacity of 500$^{th}$ cycle/discharge capacity of the first cycle)×100%.

(2) Testing of high temperature storage performance of the lithium-ion secondary battery At 25° C., the lithium-ion secondary battery was charged to 4.2 V at a constant current of 1 C, then the lithium-ion secondary battery was charged to 0.05 C at a constant voltage of 4.2 V, then the lithium-ion secondary battery was discharged to 2.8 V at a constant current of 1 C, the obtained discharge capacity was the discharge capacity before the high temperature storage process of the lithium-ion secondary battery; then the lithium-ion secondary battery was charged to 4.2 V at a constant current of 1 C, then the lithium-ion secondary battery was stored for 30 days under 60° C., after the high temperature storage process was completed, the lithium-ion secondary battery was placed in the environment of 25° C., then the lithium-ion secondary battery was discharged to 2.8 V at a constant current of 0.5 C, then the lithium-ion secondary battery was charged to 4.2 V at a constant current of 1 C, then the lithium-ion secondary battery was charged to 0.05 C at a constant voltage of 4.2 V, then the lithium-ion secondary battery was discharged to 2.8 V at a constant current of 1 C, the obtained discharge capacity was the discharge capacity after the high temperature storage process of the lithium-ion secondary battery.

Capacity retention rate after stored for 30 days under 60° C. of the lithium-ion secondary battery (%)=(the discharge capacity after the high temperature storage process of the lithium-ion secondary battery/the discharge capacity before the high temperature storage process of the lithium-ion secondary battery)×100%.

(3) Testing of gas generation during high temperature storage process of the lithium-ion secondary battery At 25° C., the lithium-ion secondary battery was charged to 4.2 V at a constant current of 1 C, then the lithium-ion secondary battery was charged to 0.05 C at a constant voltage of 4.2 V, then the lithium-ion secondary battery was discharged to 2.8 V at a constant current of 1 C, then the lithium-ion secondary battery was charged to 4.2 V at a constant current of 1 C, then the lithium-ion secondary battery was charged to 0.05 C at a constant voltage of 4.2 V, the lithium-ion secondary battery was fully charged. The volume of the lithium-ion secondary battery was measured by using the drainage method and the measured volume was the volume before the high temperature storage process. Then the lithium-ion secondary battery was stored for 30 days under 70° C., after the high temperature storage process was completed, the lithium-ion secondary battery was placed in the environment of 25° C., the volume of the lithium-ion secondary battery was measured again by using the drainage method and the measured volume was the volume after the high temperature storage process.

Volume expansion rate after stored for 30 days under 70° C. of the lithium-ion secondary battery (%)=(the volume after the high temperature storage process/the volume before the high temperature storage process−1)×100%.

TABLE 1

Parameters and test results of examples 1-9 and comparative examples 1-8

| | First additive | | Second additive | | Capacity retention rate after 500 cycles under 60° C. (%) | Capacity retention rate after stored for 30 days under 60° C. (%) | Volume expansion rate after stored for 30 days under 70° C. (%) |
|---|---|---|---|---|---|---|---|
| | Type | Mass percentage (%) | Type | Mass percentage (%) | | | |
| Example 1 | Boron phosphate | 1 | / | / | 89 | 88 | 22 |
| Example 2 | Boron phosphate | 0.5 | / | / | 87 | 86 | 25 |
| Example 3 | Boron phosphate | 3 | / | / | 90 | 89 | 19 |

TABLE 1-continued

Parameters and test results of examples 1-9 and comparative examples 1-8

| | First additive | | Second additive | | Capacity retention rate after 500 cycles under 60° C. (%) | Capacity retention rate after stored for 30 days under 60° C. (%) | Volume expansion rate after stored for 30 days under 70° C. (%) |
|---|---|---|---|---|---|---|---|
| | Type | Mass percentage (%) | Type | Mass percentage (%) | | | |
| Example 4 | Boron phosphate | 5 | / | / | 92 | 91 | 18 |
| Example 5 | Boron phosphate | 1 | Ethylene sulfate | 1 | 92 | 91 | 11 |
| Example 6 | Boron phosphate | 1 | 1,3-propanesultone | 1 | 93 | 92 | 8 |
| Example 7 | Boron phosphate | 1 | Vinylene carbonate | 1 | 92 | 91 | 11 |
| Example 8 | Boron phosphate | 1 | Vinyl ethylene carbonate | 1 | 93 | 92 | 8 |
| Example 9 | Boron phosphate | 1 | Maleic anhydride | 1 | 92 | 93 | 9 |
| Comparative example 1 | / | / | / | / | 78 | 79 | 35 |
| Comparative example 2 | Boron phosphate | 0.001 | / | / | 79 | 80 | 34 |
| Comparative example 3 | Boron phosphate | 8 | / | / | 90 | 89 | 19 |
| Comparative example 4 | / | / | Ethylene sulfate | 1 | 89 | 88 | 16 |
| Comparative example 5 | / | / | 1,3-propanesultone | 1 | 89 | 88 | 13 |
| Comparative example 6 | / | / | Vinylene carbonate | 1 | 89 | 88 | 16 |
| Comparative example 7 | / | / | Vinyl ethylene carbonate | 1 | 89 | 88 | 13 |
| Comparative example 8 | / | / | Maleic anhydride | 1 | 86 | 87 | 13 |

It could be seen from comparison among examples 1-4 and comparative example 1, in examples 1-4, the boron phosphate was added into the electrolyte, the capacity retention rate after stored for 30 days under 60° C. of the lithium-ion secondary battery was increased compared with comparative example 1 (with no additive added), the capacity retention rate after 500 cycles under 60° C. of the lithium-ion secondary battery was also increased compared with comparative example 1 (with no additive added), and the volume expansion rate after stored for 30 days under 70° C. of the lithium-ion secondary battery was decreased compared with comparative example 1 (with no additive added). This showed that the boron phosphate might inhibit the side reactions between the electrolyte and the positive active material when the lithium-ion secondary battery was used under high temperature environment, thereby improving the capacity retention rate after the high temperature cycle process and the capacity retention rate after the high temperature storage process of the lithium-ion secondary battery. Meanwhile, there was also a complexation reaction between the B atom in the boron phosphate and the hydrofluoric acid in the electrolyte, therefore the volume expansion rate after the high temperature storage process of the lithium-ion secondary battery was decreased.

It could be seen from comparison between comparative example 2 and comparative example 3, when the mass percentage of the boron phosphate was too low (<0.01%), it could not protect the positive active material, the performances of the lithium-ion secondary battery under high temperature environment were still worse; when the mass percentage of the boron phosphate was too high (>5%), it could not significantly further improve the performances of the lithium-ion secondary battery under high temperature environment.

It could be seen from comparison among examples 5-9 and comparative examples 4-8, when the boron phosphate and the second additive were added into the electrolyte at the same time, the capacity retention rate after the high temperature cycle process and the capacity retention rate after the high temperature storage process of the lithium-ion secondary battery were further increased, and the volume expansion rate after the high temperature storage process of the lithium-ion secondary battery was further decreased, it showed that the boron phosphate and the second additive might produce a synergistic effect, thereby further improving the performances of the lithium-ion secondary battery under high temperature environment.

According to the foregoing descriptions and teachings of the present disclosure, a person skilled in the art may also make appropriate variations and modifications to the above embodiments. Therefore, the present disclosure is not limited to the specific embodiments disclosed and described in the above, modifications and variations of the present disclosure will also be fallen within the scope of the appended claims of the present disclosure. Furthermore, although specific terminologies are used in the present disclosure, these terminologies are merely for convenience of description, and are not intended to limit the present disclosure.

What is claimed is:
1. An electrolyte, comprising:
a non-aqueous organic solvent;

an electrolyte salt dissolved in the non-aqueous organic solvent; and
an additive dissolved in the non-aqueous organic solvent;
the additive comprising a first additive, the first additive being selected from boron phosphate represented by formula 1;

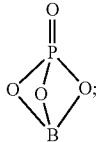

formula 1 and the additive further comprising a second additive, the second additive being C—C double bond-containing cyclic carbonate ester, wherein the C—C double bond-containing cyclic carbonate ester is one or more selected from the group consisting of compounds represented by formula 10, $R_{33}$~$R_{34}$ are independently selected from the group consisting of H, halogen atom, substituted or unsubstituted C1~C10 alkyl, substituted or unsubstituted C2~C10 alkenyl, substituted or unsubstituted C2~C10 alkynyl and substituted or unsubstituted C6~C10 aryl;

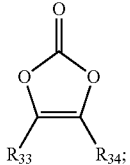

formula 10 wherein a mass of the second additive is 0.01%~5% of a total mass of the electrolyte.

2. The electrolyte according to claim 1, wherein the second additive is:

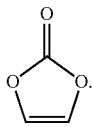

3. The electrolyte according to claim 1, wherein a mass of the first additive is 0.01%~5% of a total mass of the electrolyte.

4. The electrolyte according to claim 1, wherein the non-aqueous organic solvent comprises:
one or more selected from a group consisting of ethylene carbonate, propylene carbonate, 2,3-butylene carbonate, γ-butyrolactone and fluoroethylene carbonate; and
one or more selected from a group consisting of dimethyl carbonate, diethyl carbonate, dipropyl carbonate, ethyl methyl carbonate, methyl propyl carbonate, ethyl propyl carbonate, methyl formate, ethyl formate, propyl formate, methyl acetate, ethyl acetate, propyl acetate, methyl propionate, ethyl propionate and propyl propionate.

5. The electrolyte according to claim 1, wherein a molar concentration of the electrolyte salt in the electrolyte is 0.01 mol/L~3 mol/L.

6. A secondary battery comprising an electrolyte, the electrolyte comprising:
a non-aqueous organic solvent;
an electrolyte salt dissolved in the non-aqueous organic solvent; and
an additive dissolved in the non-aqueous organic solvent;
the additive comprising a first additive, the first additive being selected from boron phosphate represented by formula 1;

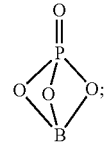

formula 1 and the additive further comprising a second additive, the second additive being C—C double bond-containing cyclic carbonate ester, wherein the C—C double bond-containing cyclic carbonate ester is one or more selected from the group consisting of compounds represented by formula 10, $R_{33}$~$R_{34}$ are independently selected from the group consisting of H, halogen atom, substituted or unsubstituted C1~C10 alkyl, substituted or unsubstituted C2~C10 alkenyl, substituted or unsubstituted C2~C10 alkynyl and substituted or unsubstituted C6~C10 aryl;

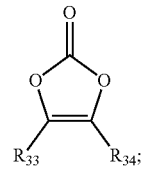

formula 10 wherein a mass of the second additive is 0.01%~5% of a total mass of the electrolyte.

7. The secondary battery according to claim 6, wherein the second additive is:

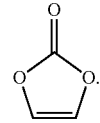

8. The secondary battery according to claim 6, wherein a mass of the first additive is 0.01%~5% of a total mass of the electrolyte.

9. The secondary battery according to claim 6, wherein the non-aqueous organic solvent comprises:
one or more selected from a group consisting of ethylene carbonate, propylene carbonate, 2,3-butylene carbonate, γ-butyrolactone and fluoroethylene carbonate; and
one or more selected from a group consisting of dimethyl carbonate, diethyl carbonate, dipropyl carbonate, ethyl methyl carbonate, methyl propyl carbonate, ethyl propyl carbonate, methyl formate, ethyl formate, propyl formate, methyl acetate, ethyl acetate, propyl acetate, methyl propionate, ethyl propionate and propyl propionate.

10. The secondary battery according to claim 6, wherein a molar concentration of the electrolyte salt in the electrolyte is 0.01 mol/L~3 mol/L.

\* \* \* \* \*